United States Patent
Lin et al.

(10) Patent No.: US 12,106,957 B2
(45) Date of Patent: Oct. 1, 2024

(54) NARROW BAND INFRARED EMITTER THROUGH THERMAL MANNER

(71) Applicant: Taiwan Nano & Micro-Photonics Co., Ltd., New Taipei (TW)

(72) Inventors: Ching-Fuh Lin, Taipei (TW); Chung-Hua Chao, New Taipei (TW); Po-Chuan Yang, New Taipei (TW)

(73) Assignee: Taiwan Nano & Micro-Photonics Co., Ltd., New Taipei (TW)

( * ) Notice: Subject to any disclaimer, the term of this patent is extended or adjusted under 35 U.S.C. 154(b) by 684 days.

(21) Appl. No.: 17/236,384

(22) Filed: Apr. 21, 2021

(65) Prior Publication Data

US 2021/0345456 A1   Nov. 4, 2021

Related U.S. Application Data

(60) Provisional application No. 63/017,660, filed on Apr. 30, 2020.

(51) Int. Cl.
*H01K 1/10* (2006.01)
*G02B 5/28* (2006.01)
*H01K 1/26* (2006.01)

(52) U.S. Cl.
CPC ............... *H01K 1/26* (2013.01); *G02B 5/281* (2013.01); *H01K 1/10* (2013.01)

(58) Field of Classification Search
CPC .................................. H01K 1/10; H01K 1/26
See application file for complete search history.

(56) References Cited

U.S. PATENT DOCUMENTS

| | | | |
|---|---|---|---|
| 5,644,676 A * | 7/1997 | Blomberg | H01K 1/02 392/407 |
| 10,001,409 B2 * | 6/2018 | Blomberg | G01J 5/046 |
| 2012/0267532 A1 * | 10/2012 | Udrea | H05B 3/267 250/338.5 |
| 2017/0012199 A1 * | 1/2017 | Sabry | G01J 3/0208 |

* cited by examiner

*Primary Examiner* — Sean M Luck
(74) *Attorney, Agent, or Firm* — Stout, Uxa & Buyan, LLP; Donald E. Stout (57) ABSTRACT

In some examples, an infrared emitter is provided with a heating layer sandwiched by top and bottom optical layers that allow only narrow-band infrared light to pass through. A reflective layer may be further provided below the bottom optical layers. This configuration greatly reduces the energy loss and can be manufactured with simple method and low cost.

9 Claims, 7 Drawing Sheets

NARROW BAND INFRARED EMITTER THROUGH THERMAL MANNER

CROSS-REFERENCE TO RELATED APPLICATIONS

This application claims the priority benefit of U.S. provisional application Ser. No. 63/017,660, filed on Apr. 30, 2020. The entirety of the above-mentioned patent application is herein expressly incorporated by reference and made a part of specification.

BACKGROUND OF THE INVENTION

1. Field of the Invention

The present invention relates to a narrow band infrared emitter through thermal manner.

2. Description of Related Art

A conventional way to generate mid-infrared light is to use a heated body that emits black-body radiation, which is the thermal electromagnetic radiation within or surrounding the heated body in thermodynamic equilibrium with its environment. However, black-body radiation has very broad-band of spectrum. For applications that only need narrow-band spectrum or do not want to be interfered by broad-band spectrum, black-body radiation is not good. Thus, a method to confine the infrared emission to a narrow-band spectrum is highly desired.

Nonlinear optics could give rise to narrow-band spectrum using laser-pumped optically parametric process. An optical parametric oscillator (OPO) is a parametric oscillator that oscillates at optical frequencies. It converts an input laser wave with frequency $\omega_p$ into two output waves of lower frequency ($\omega_s$, $\omega_i$) by means of second-order nonlinear optical interaction. For example, U.S. Pat. No. 9,685,753 B2 disclosed a tunable optical parametric oscillator (OPO), which can be tuned by setting the temperature of a nonlinear element to select a desired signal/idler combination, and narrow-band operation is effected by tuning a birefringent filter in the OPO to a temperature setting at which the filter matches the selected signal/idler combination, wherein broad and stable tunability is obtained by virtue of at least two different temperature settings of the non-linear element being matched to a single common temperature setting of the birefringent filter. However, the cost of nonlinear optics is high and the operation is not convenient.

Another way for narrow-band emission of infrared light is to use quantum-cascade lasers (QCLs)[1-3], whose laser emission is achieved through the use of intersubband transitions in a repeated stack of semiconductor multiple quantum well heterostructures. For example, U.S. Pat. No. 9,912,119 B2 disclosed a quantum cascade laser that includes a semiconductor substrate and an active layer having a multistage lamination of emission layers and injection layers. The active layer is capable of generating first pump light of a frequency $\omega_1$ and second pump light of a frequency $\omega_2$, and to generate output light of a difference frequency $\omega$ by difference frequency generation. The QCLs nonetheless require expensive growth of certain materials. Also, QCLs typically require cooling set up, so they are very expensive and not easy to operate.

Mid-infrared semiconductor light emitting diodes (LEDs) emit infrared light through the recombination of electron-hole pairs across the material band gap. For example, U.S. patent Ser. No. 08/309,980B2 discloses an infrared light emitting device in which dark current and diffusion current caused by thermally excited holes are suppressed. Seungyong Jung et al.[4] designed dual wavelength type I quantum well light emitting diodes operating at 2 μm and 3-3.4 μm wavelengths. O. Morohara et al.[5] disclosed a 3.3-μm-peak-emission high-luminous LED for $CH_4$ gas sensors. R. J. Ricker et al.[6] disclosed InAs/GaSb type-II superlattice light-emitting diodes that provide emission over the entire 3-5 μm mid-infrared wavelength band.

REFERENCES

[1] Hiroyuki YOSHINAGA et al., Mid-infrared Quantum Cascade Laser Operable in High Temperature (200° C.), *SEI TECHNICAL REVIEW*, No. 90, 94-98 (2020);

[2] Andreas Hugi et al., Mid-infrared frequency comb based on a quantum cascade laser, *Nature*, Vol. 492, 229-233 (2012);

[3] Bo Meng et al., Mid-infrared frequency comb from a ring quantum cascade laser, *Optical Society of America*, Vol. 7, No. 2, 162-167 (2020);

[4] Seungyong Jung et al., Dual wavelength GaSb based type I quantum well mid-infrared light emitting diodes, *Applied Physics Letters* 96, 191102 (2010), doi: 10.1063/1.3425899;

[5] O. Morohara et al. High-efficiency AlInSb mid-infrared LED with dislocation filter layers for gas sensors, *Journal of Crystal Growth* 518 (2019) 14-17;

[6] R. J. Ricker et al., Broadband mid-infrared superlattice light-emitting diodes, *Journal of Applied Physics* 121, 185701 (2017), doi: 10.1063/1.4983023.

SUMMARY OF THE INVENTION

One aspect of the present invention utilizes a heating layer and optical selection of certain band to achieve relatively low cost and easy operation for narrow-band infrared emission of light.

In some examples, current is applied to heat up a heating layer sandwiched by top and bottom optical layers that allow only narrow-band infrared light to pass through. Because the heated temperature is usually below temperature of 2000° C. (Celsius), the emission spectrum is usually above 2 micrometers in wavelength. The energy is then also distributed across the broad spectrum. Here the present disclosure utilizes both top and bottom optical layers to particularly select a narrow-band of infrared light to pass through, while other wavelengths of light are reflected back to the heating layer or wire. Then the energy loss is greatly reduced. Only the energy of the narrow-band infrared light that could pass through the optical layer(s) is lost (due to the emission to outside). As a result, the heating layer or wire could be maintained at a high temperature without huge input of power. In this way, the emitted spectrum is narrow and the power consumption of the Narrow Band Infrared Emitter is low. In addition, the heating layer or wire could be made of a general material, such as tungsten (W) or aluminum (Al), etc., so the fabrication is easy and the cost is low. In contrast, the laser-pumped optically parametric process requires expensive lasers and nonlinear crystals. Also, quantum-cascade lasers require expensive growth of certain materials, so cost is high.

Another aspect of the present invention provides an infrared emitter that preferably includes a substrate, a first insulating layer formed on the substrate, a heating layer formed on the first insulating layer, a second insulating layer formed on the heating layer, and an infrared light emitter formed on the second insulating layer. The infrared light emitter comprises a first metal bonding layer formed on the second insulating layer, a lower metal layer formed on the first metal bonding layer, a second metal bonding layer formed on the lower metal layer, a dielectric layer formed on the second metal bonding layer, a third metal bonding layer formed on the dielectric layer, an upper metal layer formed on the third metal bonding layer, and a fourth metal bonding layer formed on the upper metal layer.

DETAILED DESCRIPTION OF THE PREFERRED EMBODIMENT

Reference will now be made in detail to those specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations and components are not described in detail in order not to unnecessarily obscure the present invention. While drawings are illustrated in detail, it is appreciated that the quantity of the disclosed components may be greater or less than that disclosed, except where expressly restricting the amount of the components. Wherever possible, the same or similar reference numbers are used in drawings and the description to refer to the same or like parts.

Figure 1:
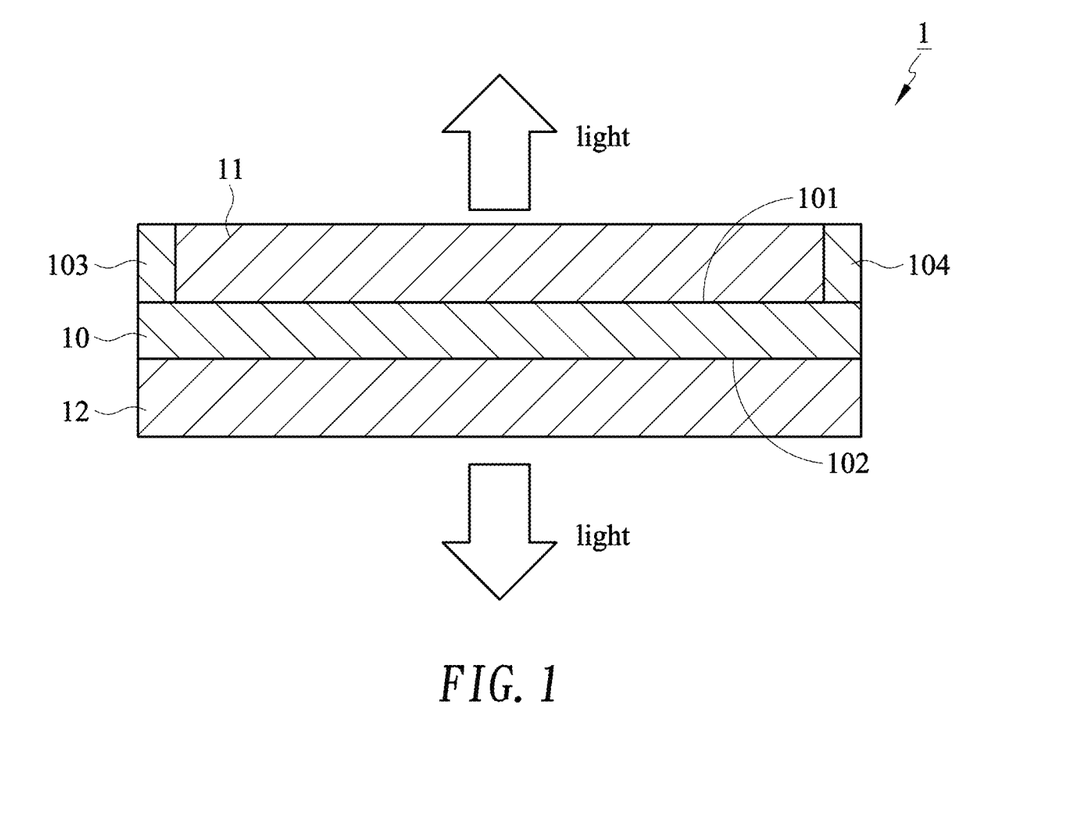
FIG. 1 is a schematic diagram showing an infrared emitter 1 in accordance with a first embodiment of the invention.

FIG. 1 is a schematic diagram showing an infrared emitter 1 in accordance with a first embodiment of the invention. Referring to FIG. 1, the infrared emitter 1 for generating infrared light includes a heating layer 10, a first bandpass filter 11, and a second bandpass filter 12. The first bandpass filter 11 is formed on a first surface 101, e.g., an upper surface, of the heating layer 10. The second bandpass filter 12 is formed on a second surface 102, e.g., a lower surface, of the heating layer 10. In one embodiment, the second bandpass filter 12 is omitted and a substrate may be further provided below the heating layer 10.

In some embodiments, both the first bandpass filter 11 and the second bandpass filter 12 consist of layers with alternating high and low refractive indices. The first bandpass filter 11 selectively transmits a certain range of wavelengths $\Delta\lambda 1$ (passband) with a peak wavelength $\lambda 1$. The second bandpass filter 12 selectively transmits the same range of wavelengths $\Delta\lambda 1$ (passband) with peak wavelength $\lambda 1$ as the first bandpass filter 11. Alternatively, the second bandpass filter 12 selectively transmits a certain range of wavelengths $\Delta\lambda 2$ (passband) with a peak wavelength $\lambda 2$. In this embodiment, infrared lights are emitted from both the top side and bottom side of the infrared emitter 1.

Figure 2A:
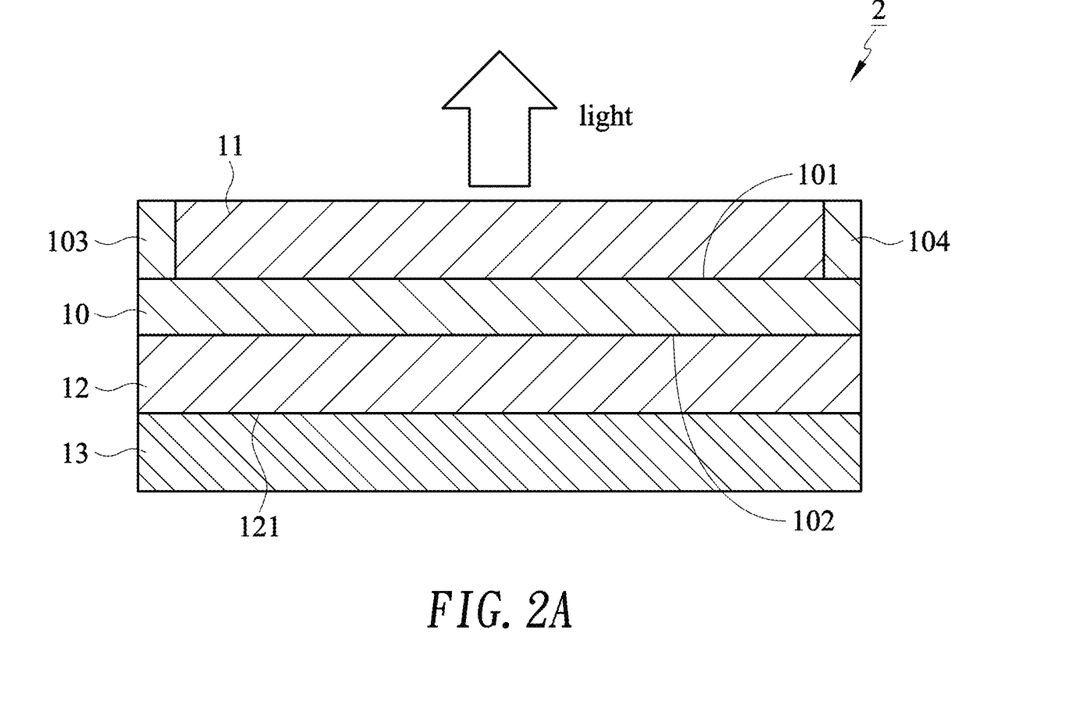
FIG. 2A is a schematic diagram showing an infrared emitter 2 in accordance with a second embodiment of the invention.

FIG. 2A is a schematic diagram showing an infrared emitter 2 in accordance with a second embodiment of the invention. The infrared emitter 2 differs from the infrared emitter 1 in that a reflective layer 13 is further provided below a bottom surface 121 of the second bandpass filter 12. In this embodiment, an infrared light is emitted from the top side of the infrared emitter 2.

Figure 2B:
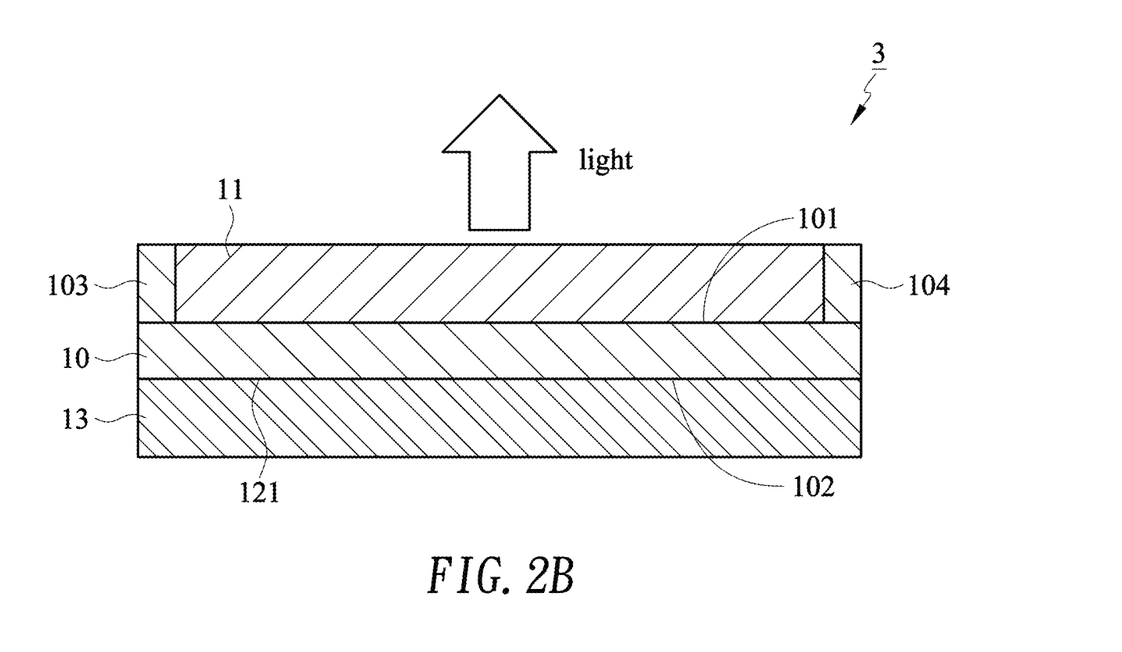
FIG. 2B is a schematic diagram showing an infrared emitter 3 in accordance with a third embodiment of the invention.

FIG. 2B is a schematic diagram showing an infrared emitter 3 in accordance with a third embodiment of the invention. The infrared emitter 3 differs from the infrared emitter 2 in that the infrared emitter 3 does not include the second bandpass filter 12, and the reflective layer 13 is provided below the second surface 102 of the heating layer 10.

Referring to FIGS. 2A and 2B, the reflective layer 13 is preferably made of a material with high reflectance for the light transmitted or emitted from the second bandpass filter 12 or the heating layer 10. In some embodiments, the reflective layer 13 is made of a metal selected from the group consisting of aurum (Au), silver (Ag), copper (Cu), aluminum (Al), platinum (Pt), and so forth. In one embodiment, the reflective layer 13 consists of alternating layers of high and low refractive index materials or dielectrics. Referring to FIG. 2A, the reflective layer 13 may have high reflectance for the wavelength bandwidth $\Delta\lambda 1$ or the wavelength bandwidth $\Delta\lambda 2$ transmitted from the second bandpass filter 12. Referring to FIG. 2B, the reflective layer 13 may have high reflectance for all wavelengths emitted from the heating layer 10.

Figure 3A:
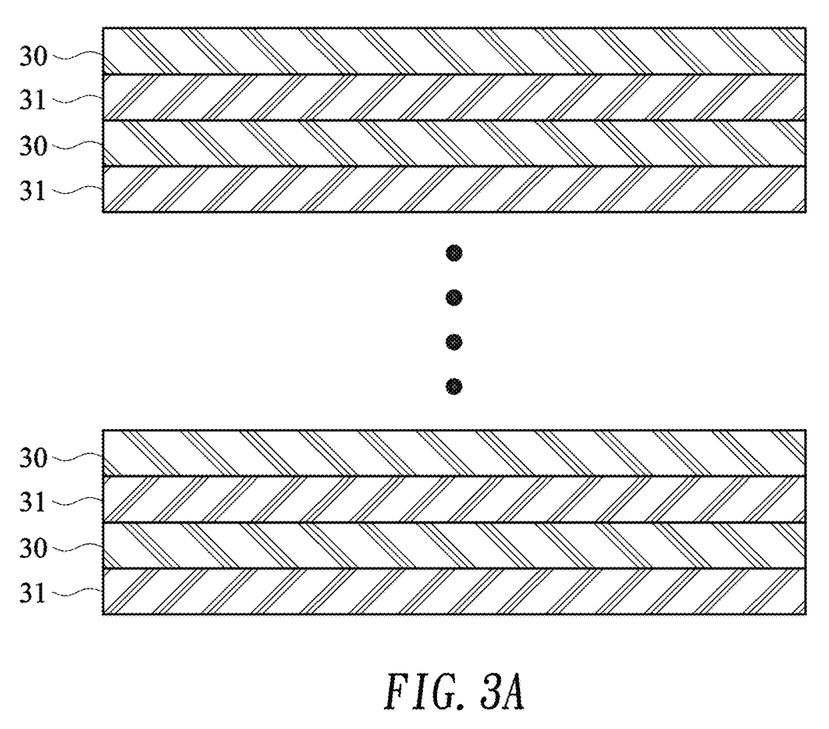
FIG. 3A is a schematic diagram showing the configuration of the first and second bandpass filter 11/12 in accordance with an embodiment of the invention.

FIG. 3A is a schematic diagram showing the configuration of the first or second bandpass filter 11/12 in accordance with an embodiment of the invention. Referring to FIG. 3A, the first or second bandpass filter 11/12 may consist of alternating high- and low-refractive index layers. In some embodiments, the first or second bandpass filter 11/12 may consist of N pairs of high/low refractive index dielectrics or materials; where N is a positive integer, such as 2, 3, or 4. In some embodiments, the positive integer N ranges between 5 and 50. Each pair includes a high-refractive-index layer 30 and a low-refractive-index layer 31. In some embodiments, the alternating high-refractive-index layers 30 and the low-refractive-index layers 31 comprise Ge/ZnS, Ge/ZnSe, $TiO_2/SiO_2$, $Si/Al_2O_3$, $TiO_2/Al_2O_3$, or $Si/TiO_2$ alternating layers. Where the high-refractive-index layers 30 may be formed of Ge, $TiO_2$, or Si, and the low-refractive-index layers 31 may be formed of ZnS, ZnSe, $SiO_2$, $Al_2O_3$, or $TiO_2$. Although specific materials have been illustrated, other similar alternating materials may be used.

Figure 3B:
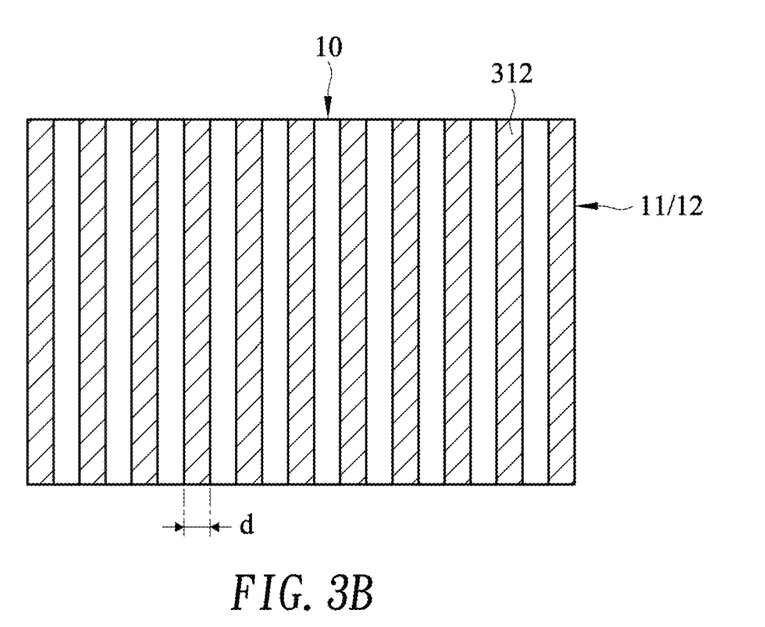
FIG. 3B is a schematic diagram showing the configuration of the first or second bandpass filter 11/12 in accordance with another embodiment of the invention.

FIG. 3B is a top or bottom view showing the configuration of the first and the second bandpass filter 11/12 in accordance with another embodiment of the invention. Referring to FIG. 3B, the first or second bandpass filter 11/12 comprises metal nanostructures 312, such as metal strips 312. For example, periodically arranged metal strips 312 are placed on or below the heating layer 10, and its light transmission wavelength is related to the dimension of the metal strips 312 and obey a relationship: $\lambda = 2\, n_{\mathit{eff}} \times d$, where $\lambda$ denotes a wavelength of the light through which the metal strips 312 selectively transmits, d denotes the width of the metal strips 312, and $n_{\mathit{eff}}$ denotes the effective refractive index of the metal strips 312.

Referring to FIGS. 1, 2A, and 2B, the heating layer 10 is preferably made of a conductive material with proper electric resistivity. In some embodiments, the heating layer 10 may be made of a material selected from the group consisting of tungsten (W), titanium nitride (TiN), aurum (Au), aluminum (Al), a doped polysilicon, and so forth.

In some embodiments, the heating layer 10 includes two electrodes, e.g., a positive electrode 103 and a negative electrode 104 formed on its upper surface, and the heating layer 10 is heated up by applying electric current through the positive electrode 103 and the negative electrode 104. Once the heating layer 10 is heated to a certain temperature, it emits a light with a broad bandwidth. The first bandpass filter 10 selectively transmits a range of wavelengths $\Delta\lambda 1$ of the light. The second bandpass filter 12 selectively transmitting the range of wavelengths $\Delta\lambda 1$ or a range of wavelengths $\Delta\lambda 2$ of the light. Typically the heating layer 10 is heated below 2000° C. and emits a light with a peak wavelength greater than 2 micrometers. In some embodiments, the heating layer 10 is heated to a temperature between 50° C. and 300° C. In some embodiments, the heating layer 10 is heated to a temperature between 100° C. and 200° C.

Figure 4:
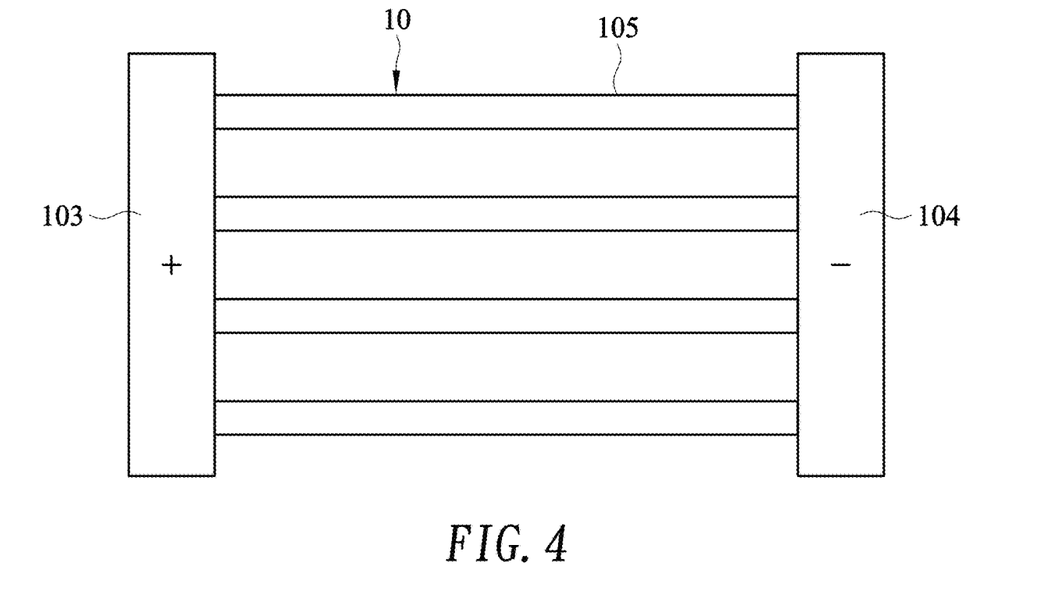
FIG. 4 is a top view showing a grid-patterned heating layer 10 in accordance with an embodiment of this invention.

In one embodiment, the heating layer 10 may have a rectangular cross sectional area. In some embodiments, the heating layer 10 may be patterned, such as grid-patterned, spiral-patterned, or snake patterned. And the patterns are designed with certain cross sectional areas and lengths, so the resistivity gives the required heat when the heating layer 10 is biased at some certain voltages. FIG. 4 is a top view showing a grid-patterned heating layer 10 in accordance with an embodiment of this invention. Referring to FIGS. 1, 2A, 2B, and 4, the grid-patterned heating layer 10 includes a positive electrode 103 and a negative electrode 104 parallel with each other, and several horizontal fingers 105 evenly spaced between the positive electrode 103 and the negative electrode 104.

Figure 5:
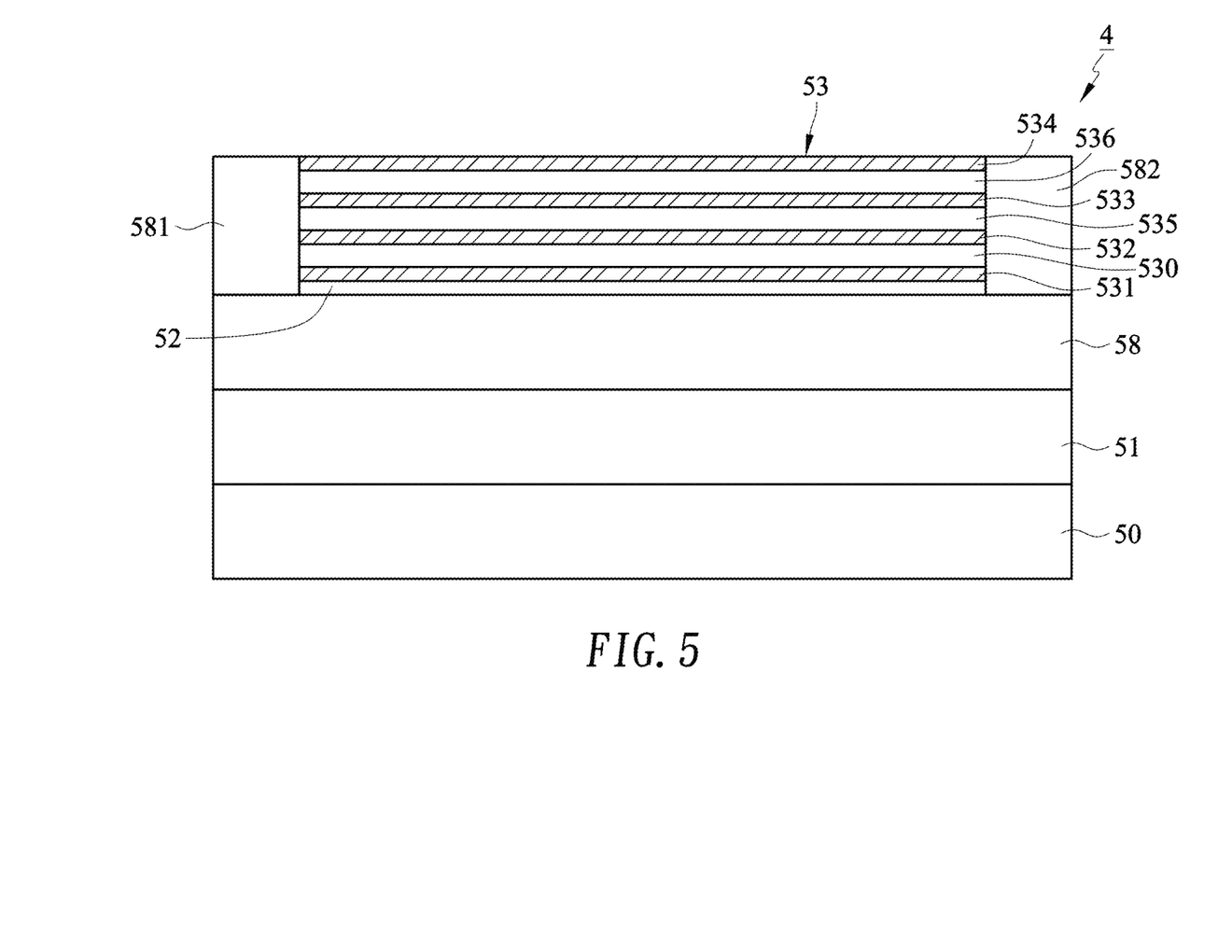
FIG. 5 is a schematic side view illustrating an infrared emitter 4 according to another embodiment of this invention.

FIG. 5 is a schematic side view illustrating an infrared emitter 4 in accordance with an embodiment of this invention. Referring to FIG. 5, the infrared emitter 4 preferably includes a substrate 50, a first insulating layer 51, a second insulating layer 52, an infrared light emitter 53, and a heating layer 58. The first insulating layer 51, typically made of oxide or nitride, is formed on the substrate 50. The heating layer 58 is formed on the first insulating layer 51. The second insulating layer 52, typically made of oxide or nitride, is formed on the heating layer 58. The infrared light emitter 53 is formed on the second insulating layer 52.

In detail, the infrared light emitter 53 preferably includes a lower metal layer 530, a first metal bonding layer 531, a second metal bonding layer 532, a third metal bonding layer 533, a fourth metal bonding layer 534, a dielectric layer 535, and an upper metal layer 536. The lower metal layer 530 is formed on the second insulating layer 52 and is sandwiched between the first metal bonding layer 531 and the second metal bonding layer 532. The dielectric layer 535 is formed on the lower metal layer 530 and is sandwiched between the second metal bonding layer 532 and the third metal bonding layer 533. The upper metal layer 536 is formed on the dielectric layer 535 and is sandwiched between the third metal bonding layer 533 and the fourth metal bonding layer 534.

Physical or chemical processes, e.g., sputtering, evaporation, chemical vapor deposition, metal-organic chemical vapor deposition (MOCVD), or atomic layer deposition (ALD), may be utilized to fabricate the lower metal layer 530, the first metal bonding layer 531, the second metal bonding layer 532, the third metal bonding layer 533, the fourth metal bonding layer 534, the dielectric layer 535, and the upper metal layer 536.

In addition, the substrate 50 may be a glass substrate, a plastic substrate, a semiconductor substrate, a metal substrate, a dielectric substrate, a composite substrate, and so forth. The lower metal layer 530 may be made of aluminum (Al), silver (Ag), aurum (Au), platinum (Pt), Chromium (Cr), titanium (Ti), nickel (Ni), iron (Fe), tantalum (Ta), copper (Cu), tungsten (W), cobalt (Co), molybdenum (Mo), and so forth. The dielectric layer 535 may be made of oxide, nitride, or other insulating materials. The upper metal layer 536 may be made of aluminum (Al), silver (Ag), aurum (Au), platinum (Pt), Chromium (Cr), titanium (Ti), nickel (Ni), iron (Fe), tantalum (Ta), copper (Cu), tungsten (W), cobalt (Co), molybdenum (Mo), and so forth. The heating layer 58 may be made of a conductive material, for example but is not limited to: titanium nitride (TiN), aurum (Au), aluminum (Al), a doped polysilicon, chromium (Cr), or other conductive materials. The first metal bonding layer 531, the second metal bonding layer 532, the third metal bonding layer 533, and the fourth metal bonding layer 534 may be made of a material selected from the group consisting of titanium (Ti), zirconium (Zr), tantalum (Ta), chromium (Cr), and the like.

In one prefer embodiment, two electrodes, e.g., a positive electrode 581 and a negative electrode 582, are formed on the upper surface of the heating layer 58, and the heating layer 58 is heated up by applying electric current through the positive electrode 581 and the negative electrode 582. The positive electrode 581 and the negative electrode 582 may be made of a material same as the heating layer 58.

Referring to FIG. 5, once the heating layer 58 is heated to a certain temperature, the infrared light emitter 53 emits an infrared light with a narrow bandwidth. The wavelength of the infrared light emitted from the infrared light emitter 53 generally relates to the materials and the thicknesses of the lower metal layer 530, the dielectric layer 535, and/or the upper metal layer 536.

In some embodiments, the thickness of the lower metal layer 530 ranges between 80 nm and 240 nm, the thickness of the dielectric layer 535 ranges between 80 nm and 160 nm, the thickness of the upper metal layer 536 ranges between 80 nm and 240 nm, and the thicknesses of the first to fourth metal bonding layer range between 5 nm and 30 nm.

Figure 6A:
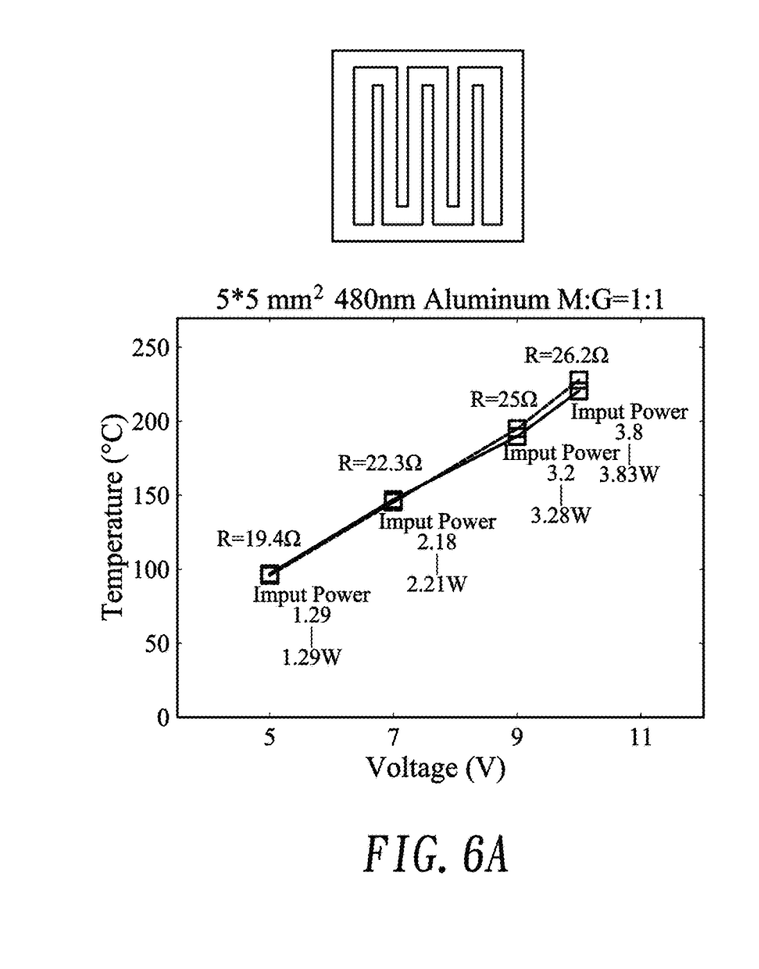
FIGS. 6A and 6B show two measured temperature versus input power curves in accordance with the infrared emitter provided in FIG. 5.

FIG. 6A shows a measured temperature versus input power of the heating layer 58 in the infrared emitter 4 of FIG. 5, where a snake-patterned aluminum layer is employed as the heating layer. Referring to FIG. 6A, the infrared emitter 3 is heated to a temperature between about 100° C. and about 230° C. in response to a voltage between 5 and 10 V applied to the positive electrode 581 and the negative electrode 582.

Figure 6B:
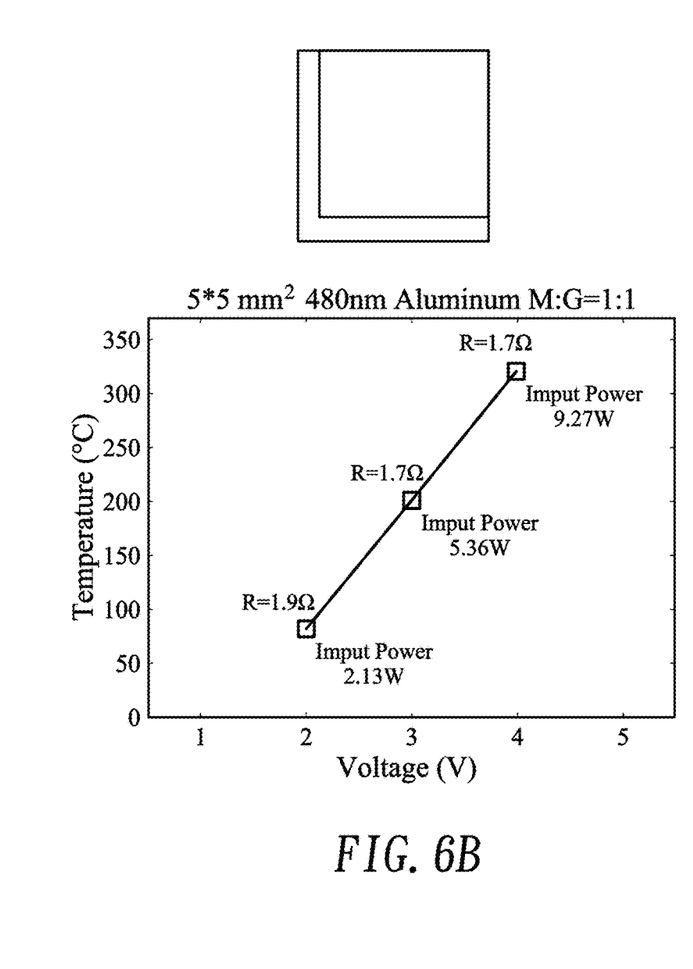

FIG. 6B shows another measured temperature versus input power curve similar to FIG. 6A, where a rectangular aluminum layer is employed as the heating layer. Referring to FIG. 6B, the infrared emitter 3 is heated to a temperature between about 85° C. and about 320° C. in response to a voltage between 2 and 4 V applied to the positive electrode 581 and the negative electrode 582.

Figure 7:
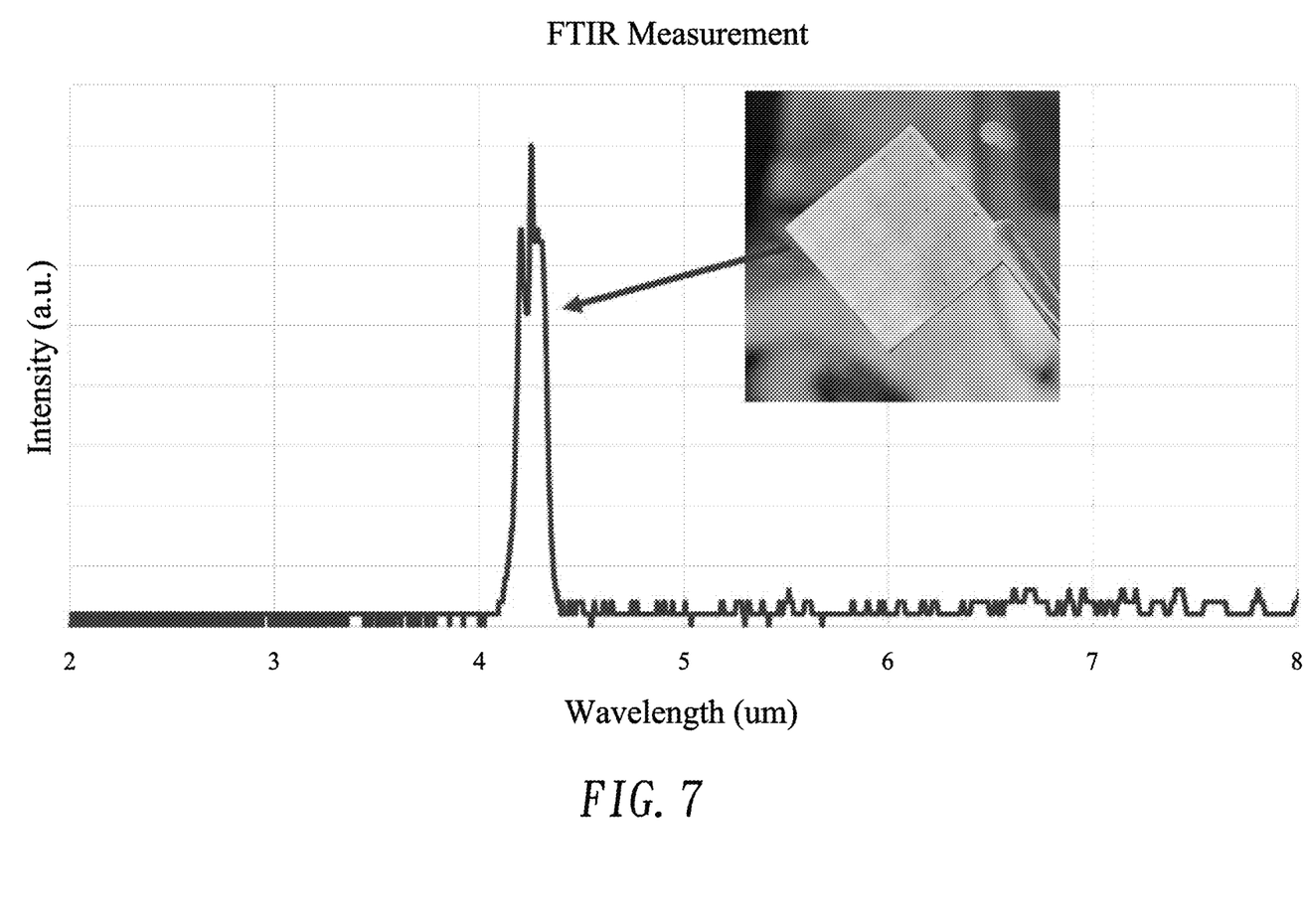
FIG. 7 shows the emission spectrum of an infrared emitter having a configuration shown in FIG. 5.

FIG. 7 shows the emission spectrum of an infrared emitter having a configuration shown in FIG. 5. A Fourier-transform infrared (FTIR) spectrometer is employed to measure the emission spectrum. In this example, a $SiO_2$ layer is deposited on a 3.8×3.8 $mm^2$ substrate 50 as the first insulating layer 51. Then an aluminum layer 58 is deposited on the first insulating layer 51, and two aluminum electrodes 581/582 are deposited on the upper surface of the aluminum layer 58. Another $SiO_2$ layer 52 is deposited on the upper surface of the aluminum layer 58. After that, the layers of the infrared light emitter 53, including a first titanium layer 531, a first aluminum layer 530, a second titanium layer 532, a $SiO_2$ dielectric layer 535, a third titanium layer 533, a second aluminum layer 536, and a fourth titanium layer 534, are deposited in sequence. Where the thicknesses of the first, second, third, and fourth titanium layers 531/532/533/534 are 5 nm, the thicknesses of the first and second aluminum layers 530/536 are 120 nm, and the thickness of the $SiO_2$ dielectric layer 535 is 100 nm. Referring to FIG. 7, the exemplary infrared emitter emits an infrared light with a peak wavelength of 4.26 um and a full width at half maximum (FWHM) about 0.15 um. It is also possible to design the layer structures and patterns of the infrared emitter for other desired emitting wavelengths and their corresponding FWHM.

The intent accompanying this disclosure is to have each/all embodiments construed in conjunction with the knowledge of one skilled in the art to cover all modifications, variations, combinations, permutations, omissions, substitutions, alternatives, and equivalents of the embodiments, to the extent not mutually exclusive, as may fall within the spirit and scope of the invention.

Conditional language, such as, among others, "can," "could," "might," or "may," unless specifically stated otherwise, or otherwise understood within the context as used, is generally intended to convey that embodiments include, and in other interpretations do not include, certain features, elements and/or steps. Thus, such conditional language is not generally intended to imply that features, elements and/or steps are in any way required for one or more embodiments, or interpretations thereof, or that one or more embodiments necessarily include logic for deciding, with or without user input or prompting, whether these features, elements and/or steps are included or are to be performed in any particular embodiment.

Although specific embodiments have been illustrated and described, it will be appreciated by those skilled in the art that various modifications may be made without departing from the scope of the present invention, which is intended to be limited solely by the appended claims.

What is claimed is:

1. An infrared emitter, comprising:
   a substrate;
   a first insulating layer formed on the substrate;
   a heating layer formed on the first insulating layer;
   a second insulating layer formed on the heating layer; and
   an infrared light emitter formed on the second insulating layer;
   wherein the infrared light emitter comprising:
      a first metal bonding layer formed on the second insulating layer;
      a lower metal layer formed on the first metal bonding layer;
      a second metal bonding layer formed on the lower metal layer;
      a dielectric layer formed on the second metal bonding layer;
      a third metal bonding layer formed on the dielectric layer;
      an upper metal layer formed on the third metal bonding layer; and
      a fourth metal bonding layer formed on the upper metal layer.

2. The infrared emitter as recited in claim 1, further comprising:
   a positive electrode and a negative electrode formed on the upper surface of the heating layer.

3. The infrared emitter as recited in claim 1, wherein the lower metal layer is made of a material selected from the group consisting of aluminum (Al), silver (Ag), aurum (Au), platinum (Pt), Chromium (Cr), titanium (Ti), nickel (Ni), iron (Fe), tantalum (Ta), copper (Cu), tungsten (W), cobalt (Co), and molybdenum (Mo).

4. The infrared emitter as recited in claim 1, wherein the upper metal layer is made of a material selected from the group consisting of aluminum (Al), silver (Ag), aurum (Au), platinum (Pt), Chromium (Cr), titanium (Ti), nickel (Ni), iron (Fe), tantalum (Ta), copper (Cu), tungsten (W), cobalt (Co), and molybdenum (Mo).

5. The infrared emitter as recited in claim 1, wherein the first metal bonding layer, the second metal bonding layer, the third metal bonding layer, and the fourth metal bonding layer are made of a material selected from the group consisting of titanium (Ti), zirconium (Zr), tantalum (Ta), and chromium (Cr).

6. The infrared emitter as recited in claim 1, wherein the thickness of the dielectric layer ranges between 80 nm and 160 nm.

7. The infrared emitter as recited in claim 1, wherein the thickness of the upper metal layer ranges between 80 nm and 240 nm.

8. The infrared emitter as recited in claim 1, wherein the thickness of the lower metal layer ranges between 80 nm and 240 nm.

9. The infrared emitter as recited in claim 1, wherein the heating layer is patterned.

* * * * *